(12) United States Patent  
McGrail

(10) Patent No.: US 8,689,942 B2  
(45) Date of Patent: Apr. 8, 2014

(54) ENERGY STORAGE AND RELEASE SYSTEM

(75) Inventor: Richard A. McGrail, Worcester, MA (US)

(73) Assignee: Raytheon Company, Waltham, MA (US)

( * ) Notice: Subject to any disclaimer, the term of this patent is extended or adjusted under 35 U.S.C. 154(b) by 238 days.

(21) Appl. No.: 12/953,580

(22) Filed: Nov. 24, 2010

(65) Prior Publication Data

US 2012/0125717 A1    May 24, 2012

(51) Int. Cl.
*F03G 1/00* (2006.01)
*G05G 1/00* (2008.04)

(52) U.S. Cl.
USPC .................................. 185/39; 185/37; 74/575

(58) Field of Classification Search
USPC ........ 185/37, 39, 38, 40 R, 41 R, 40 B, 40 C, 185/40 F, 40 H, 45; 446/249, 317, 430, 333, 446/334, 464, 437; 74/575, 159, 167, 169
See application file for complete search history.

(56) References Cited

U.S. PATENT DOCUMENTS

| | | | |
|---|---|---|---|
| 4,087,013 A * | 5/1978 | Wiley, Jr. .................. | 414/459 |
| 4,137,738 A | 2/1979 | Marold | |
| 4,237,357 A | 12/1980 | Opfer | |
| 4,269,050 A | 5/1981 | Bechtiger et al. | |
| 4,738,649 A * | 4/1988 | Delli Bovi et al. ............ | 446/336 |
| 5,113,056 A | 5/1992 | Kuhn | |
| 5,856,643 A | 1/1999 | Gress, Jr. et al. | |
| 7,191,752 B2 | 3/2007 | Schriever et al. | |
| 7,296,830 B2 | 11/2007 | Koveal et al. | |
| 7,604,145 B2 | 10/2009 | Percy | |
| 7,626,279 B2 | 12/2009 | Brown et al. | |
| 7,687,733 B2 | 3/2010 | Weister et al. | |
| 2008/0178439 A1* | 7/2008 | Huang ....................... | 24/68 CD |
| 2010/0224843 A1* | 9/2010 | Christensen et al. ......... | 254/271 |

* cited by examiner

*Primary Examiner* — Alan B Waits
(74) *Attorney, Agent, or Firm* — Pierce Atwood LLP; Joseph M. Maraia

(57) ABSTRACT

The technology is directed to an energy storage and release system that stores energy and enables a repeatable and accurately timed release of energy. A shaft member supports a drive assembly, a locking assembly and a lever member there between. The lever member and locking assembly are attached to the shaft. The drive assembly rotates freely about the shaft and loads energy into a torsion spring in communication with the lever member. The torsion spring connects at one end to the drive assembly and at the other end to the lever member without contacting the shaft member. The locking assembly provides a triggered release mechanism for selective release of stored energy from the torsion spring that accordingly rotates the lever member. The system can automatically reload the torsion spring once a signal is received from any number of events including, when the rotating lever member contacts a stop member or limit sensor that signals the end of travel for the lever member in either rotational directions.

8 Claims, 7 Drawing Sheets

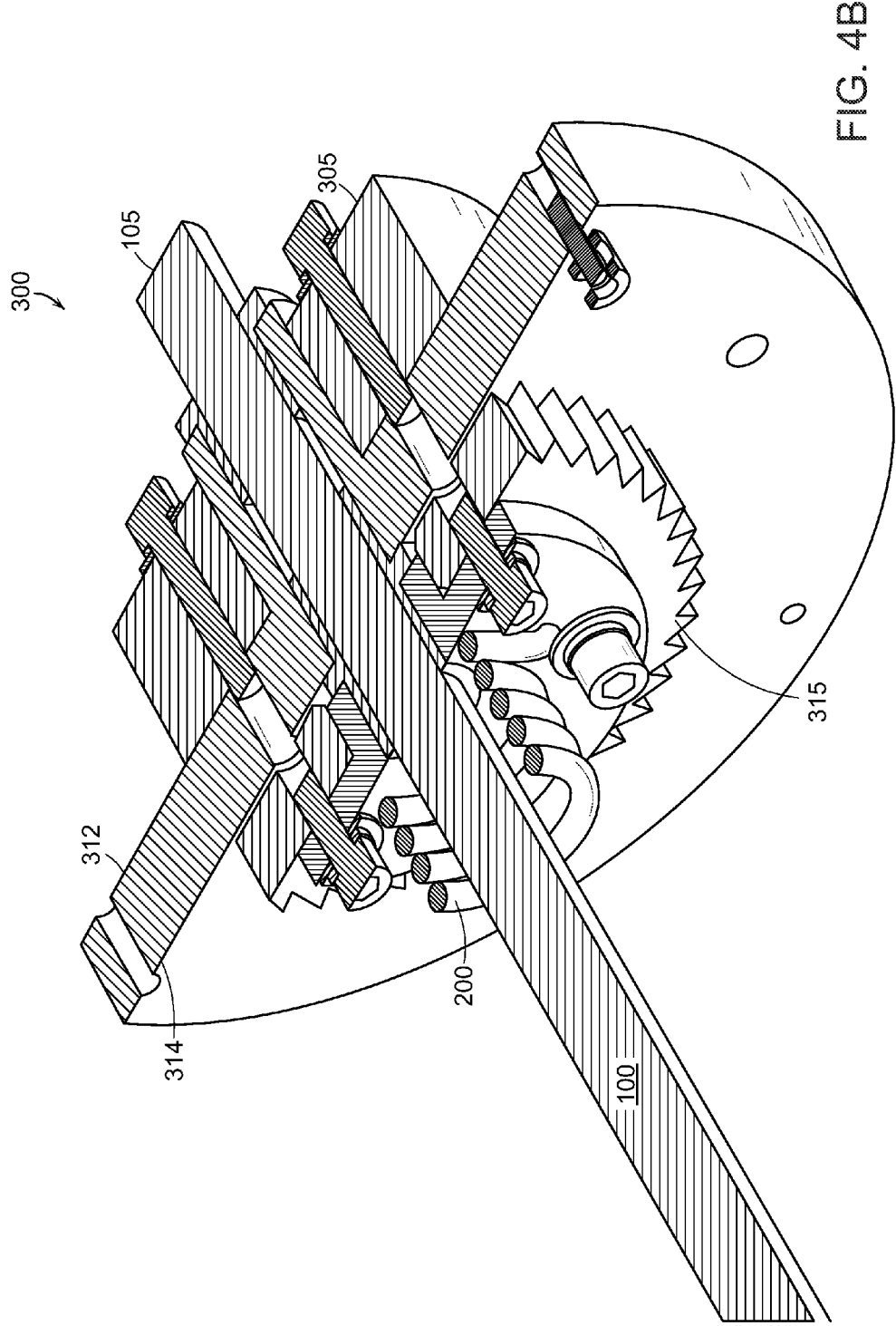

ENERGY STORAGE AND RELEASE SYSTEM

BACKGROUND

Energy release mechanisms generally require numerous integrated moving parts to selectively engage and disengage a drive train and thereby release stored energy. Such complex systems include, for example, high energy electromagnetic clutches, large mechanical clutches and transmissions, and complex release and escapement mechanisms. These systems are generally complex and prone to multiple modes of failure because of the complexity of enmeshed and/or selectively engaged moving parts. The high part count and associated complexity of manufacture increases overall system cost. Additionally, most of these systems are large and weighty, thereby further hindering their incorporation into agile, articulated robotic devices. A need exists for a device that enables simple transmission, locking, and release of energy.

SUMMARY

One approach to energy storage and release is a system. The system includes a shaft member having a proximal end and a distal end. The system further includes at least one torsion spring positioned about the shaft member having a first end and a second end. The system further includes a drive assembly positioned about the proximal end of the shaft member and coupled to the first end of the at least one torsion spring, wherein the drive assembly loads the at least one torsion spring with stored energy during rotation in a first direction about the shaft member. The system further includes a locking assembly including a stop member, the locking assembly coupled to the distal end of the shaft member. The system further includes a lever member affixed to the shaft member and coupled to the second end of the at least one torsion spring. The lever member engages the stop member to allow loading, of the at least on torsion spring when the drive assembly is rotated in the first direction.

Another approach to energy storage and release is a device. The device includes at least one torsion spring positioned about a shaft member having a first end and a second end. The device further includes a drive assembly positioned about the shaft member and coupled to the first end of the at least one torsion spring, wherein the drive assembly loads at least one torsion spring with stored energy during rotation in a first direction about the shaft member. The device further includes a locking assembly including a stop member. The locking assembly is coupled to the shaft member. The device further includes a lever member affixed to the shaft member and coupled to the second end of the at least one torsion spring. The lever member engages the stop member to allow loading of the at least on torsion spring when the drive assembly is rotated in the first direction.

Another approach to energy storage and release is a system. The system includes means for rotating; means for storing energy connected to the means for rotating; means for loading the means for storing energy with energy during rotation of the means for rotating; means for locking the means for rotating; and means for releasing the stored energy by releasing the means for rotating.

In other examples, any of the approaches above can include one or more of the following features.

In some examples, the drive assembly includes a drive pawl/gear assembly that prevents rotation of the drive assembly in a second direction opposite the first direction during loading of the at least one torsion spring.

In other examples, the locking assembly includes a ratchet pawl/gear assembly that prevents rotation of the lever member in a second direction opposite the first direction during loading of the at least one torsion spring.

In some examples, the system includes a trigger assembly engaged with the ratchet pawl/gear assembly for selectively enabling rotation of the lever member in the second rotational direction.

In other examples, the trigger assembly is a pneumatic cylinder coupled to the ratchet pawl.

In some examples, the system includes a control/monitoring system that actuates the trigger assembly in response to a trigger event.

In other examples, the trigger event is at least one of an object entering a predetermined proximity limit in spatial relation to the lever member and a predetermined tension limit of the torsion spring.

In some examples, the control/monitoring system includes at least one of a processor, an encoder and decoder, a pressure sensor, a proximity sensor, and an optical sensor.

In other examples, the system includes a second torsion spring positioned about the shaft member and coupled at a first end to the drive assembly and at a second end to the lever member.

The energy storage and release technology described herein can provide one or more of the following advantages. The technology advantageously provides a simple transmission, locking, and release of energy without requiring an intermediate device (e.g., a clutch) that disengages the drive train to release the stored energy, thereby reducing the manufacturing cost of the technology and increasing the useful working life of the technology by simplification of the internal mechanisms. The technology advantageously provides for automatic and adjustable levels of energy release and/or can allow for output torque to exceed initial input levels, thereby increasing the useful range of uses for the technology while maintaining a high level of output power.

The technology advantageously provides a simple transmission of power, a simple locking/retention of stored energy, and/or a simple release of energy (i.e., without the need for a clutch), thereby reducing the number of moving parts which decreases break-downs the technology and increases the useful span of the technology. The technology advantageously can provide an instantaneous recovery to restart energy storing cycle, thereby increasing the usage rate for the technology and decreasing the cost per energy release. The technology can advantageously provide an adjustable release and/or an automatic release, thereby increasing the adaptability of the technology by enabling the technology to work with and as part of different machines (e.g., robot, factory machine, etc.). The technology can advantageously provide a parallel stacking of torsion springs for increased torque load, thereby increasing the effective energy output range of the technology while keeping the input energy at a steady state. The technology can advantageously provide an intelligent and programmable release of the stored energy, thereby increasing the adaptability of the technology to work with and as part of different machines.

BRIEF DESCRIPTION OF THE DRAWINGS

One will better understand these and other features, aspects, and advantages of the present invention following a review of the description, appended claims, and accompanying drawings in which:

FIG. 4B depicts a top cross sectional view of the drive assembly depicted in FIG. 4A.

DETAILED DESCRIPTION

The energy storage and release technology described herein advantageously simplifies the repeatable and accurately timed storage and release of energy, thereby providing a quick and cost-effective release of energy. The technology can be used, for example, by a machine (e.g., snake robot, wheeled robot with articulated arm, factory machine, human robot, etc.) for the direct application of energy for movement (e.g., jumping, snapping, kicking, biting, hopping, spinning, etc). For example, a robot with a smashing arm utilizes the technology to store energy for the smashing arm and release the stored energy via the smashing arm to hit another item (e.g., a different robot, a door, a window, etc.). As another example, a snake robot with two articulated components utilizes the technology to store energy for the movement of a joint between the two articulated components and release the stored energy via the joint causing the snake robot to jump (e.g., jump over an obstacle, jump up a stair, etc.).

Figure 1:
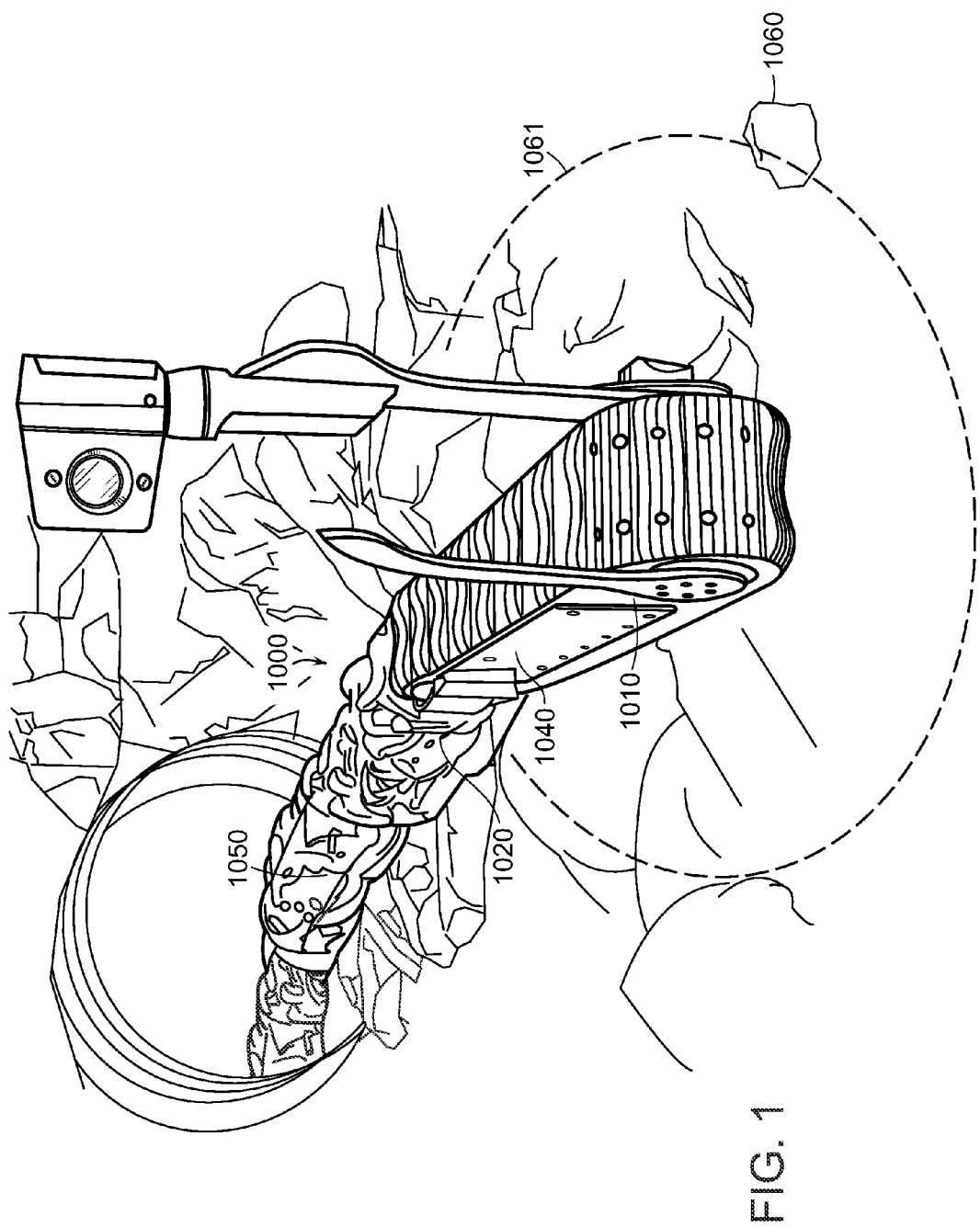
FIG. 1 depicts a robot with exemplary energy storage and release components.

FIG. 1 depicts a robot 1000 with exemplary energy storage and release components. The robot 1000 includes a plurality of articulated components (in this example, a drive mechanism 1040 and a center connection mechanism 1050). The drive mechanism 1040 and the center connection mechanism 1050 are connected by a connection joint 1020.

The connection joint 1020 includes an energy storage and release component (not shown). The energy storage and release component of the connection joint 1020 enables the robot 1000 to jump from the surface the robot 1000 is traveling over. For example, the robot 1000 can jump over an obstacle (e.g., rock, branch, etc.) by storing energy in the energy storage and release component and releasing the stored energy once the robot 1000 is in close proximity to the obstacle 1060, thereby causing the robot 1000 to move over the obstacle.

The robot 1000 includes a swinging arm 1010. The swinging arm 1010 includes an energy storage and release component (not shown). The energy storage and release component of the swinging arm 1010 enables the robot 1000 to move and/or hit items (e.g., break a window, flip a rock, etc.).

Figure 2:
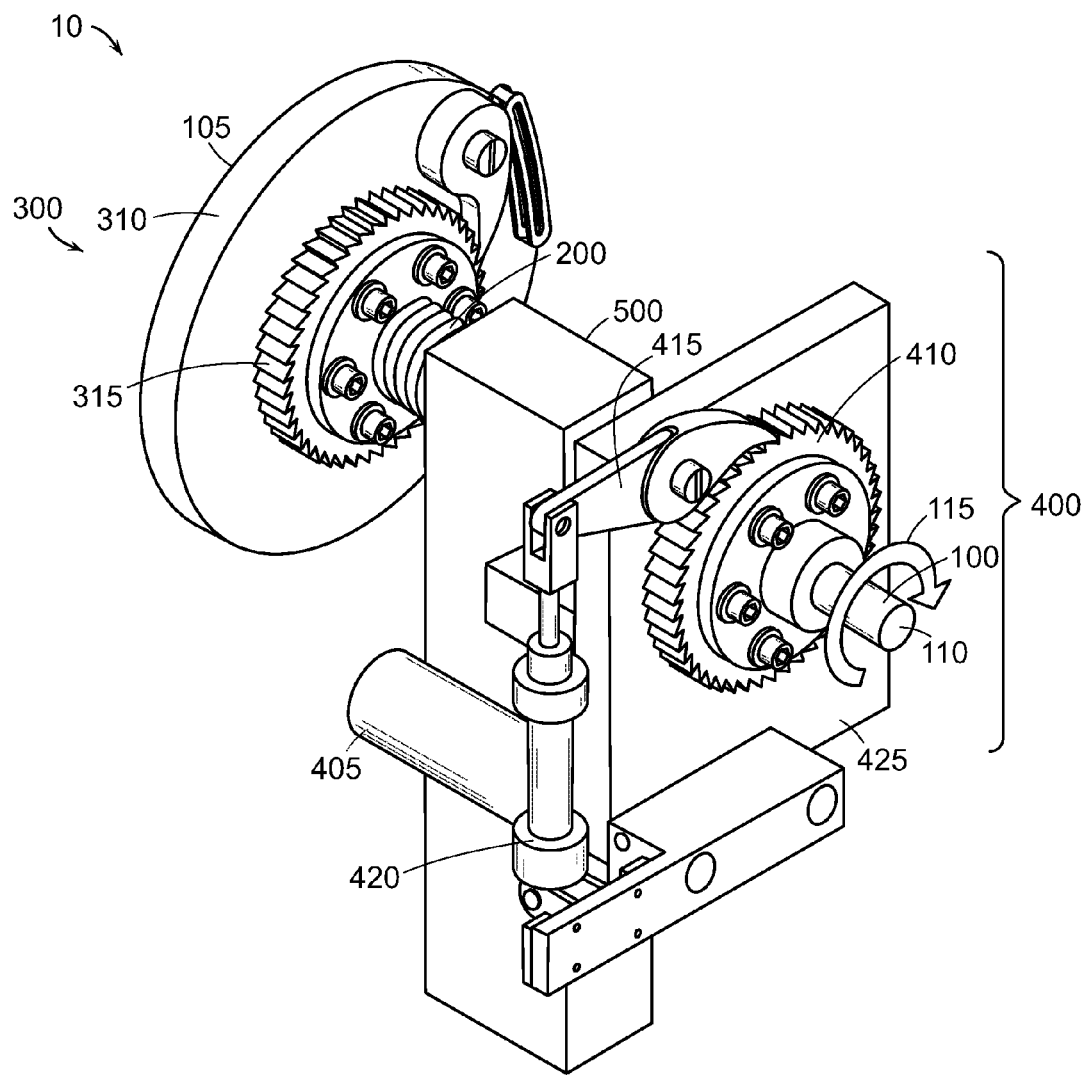
FIG. 2 depicts a perspective view of an exemplary energy storage and release system.
Figure 3:
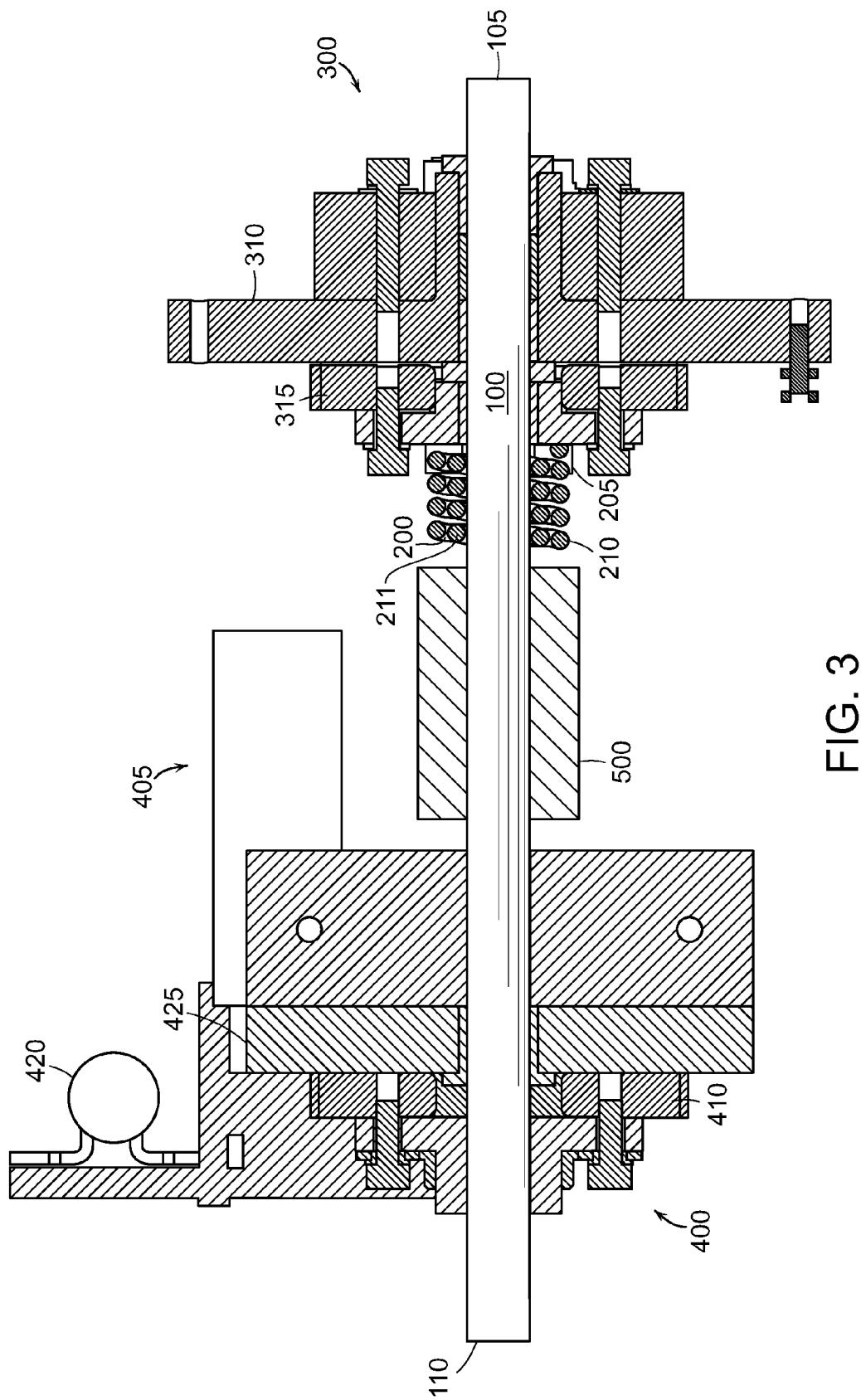
FIG. 3 depicts a top cross sectional view of the exemplary energy storage and release system of FIG. 2.
Figure 4A:
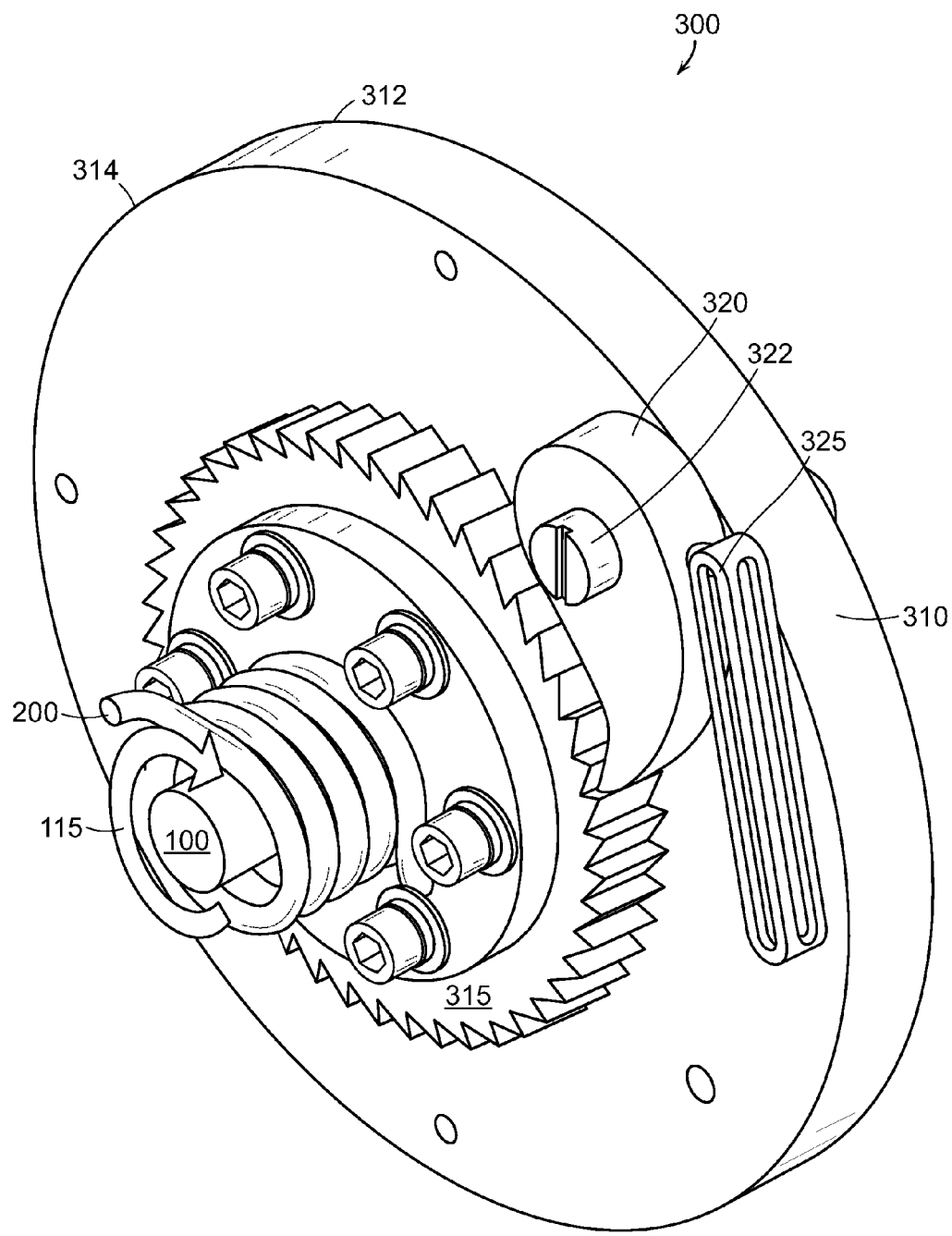
FIG. 4A depicts a perspective view of the exemplary drive assembly of FIG. 2.
Figure 5:
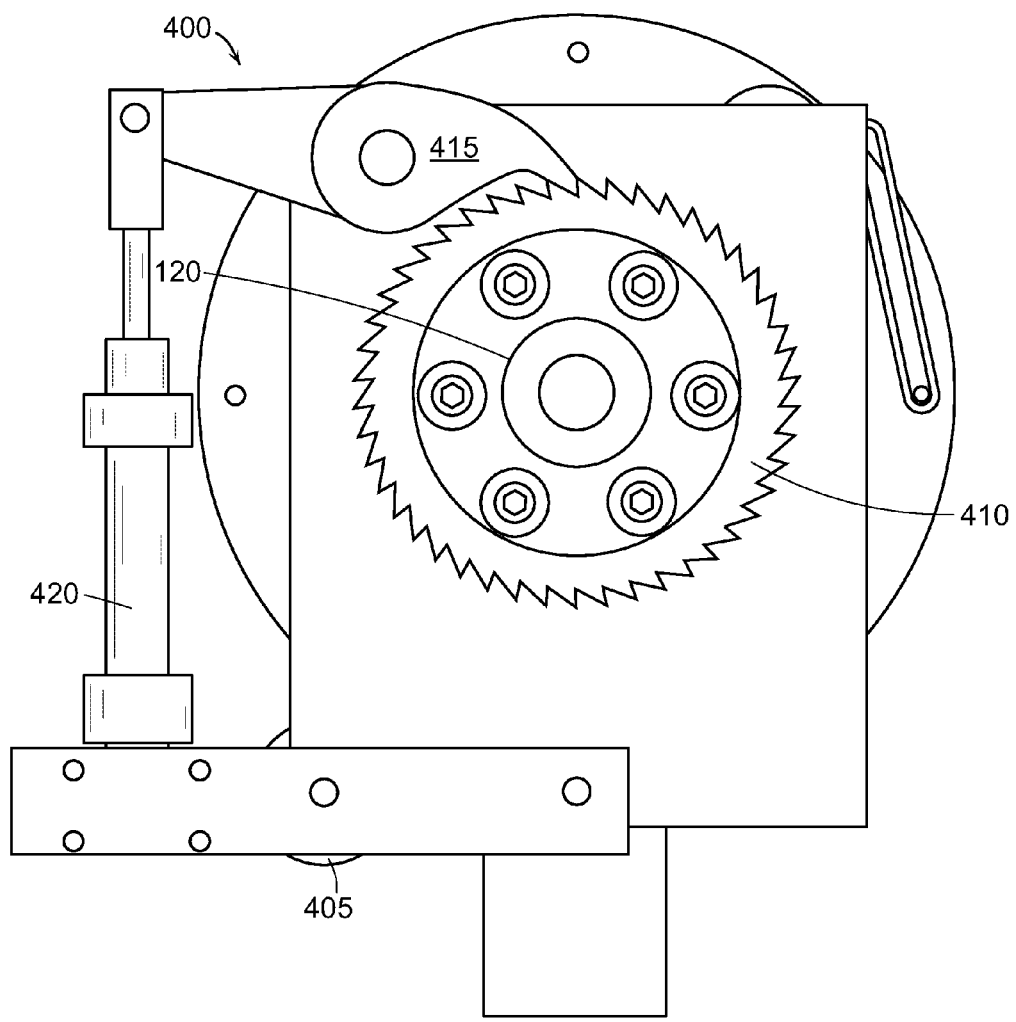
FIG. 5 depicts an exemplary locking assembly.

FIG. 2 depicts a perspective view of an exemplary energy storage and release system 10. FIG. 3 depicts a top cross sectional view of the exemplary system 10 depicted in FIG. 2. FIG. 4A depicts a perspective view of the drive assembly 300 of the system 10 depicted in FIGS. 1 and 2. FIG. 4B depicts a top cross sectional view of the drive assembly 300 depicted in FIG. 4A. FIG. 5 depicts an exemplary locking assembly 400 of the system 10. For ease of reference, FIGS. 2, 3, 4A, 4B, and 5 are described together as follows. Although FIGS. 2, 3, 4A, 4B, and 5 are described together, in some examples, the system 10 can include one or more of the following components.

The system 10 includes a shaft member 100, a torsion spring 200, a drive assembly 300, a locking assembly 400, and a lever member 500. The shaft member 100 couples the drive assembly 300, the locking assembly 400, and the lever assembly 500 together and has a proximal end 105 and a distal end 110. The torsion spring 200 stores energy from the drive assembly 300 and releases the stored energy to the lever assembly 500. The drive assembly 300 rotates the torsion spring 200 to store energy in the torsion spring 200. The locking assembly 400 locks the level member 500 to control the release of the stored energy from the torsion spring 200. The level member 500 releases the stored energy from the torsion spring 200 upon release by the locking assembly 400.

The torsion spring 200 floats freely about the shaft member 100 without making any direct contact with the shall member 100, which enables the torsion spring 200 to store and release energy without frictional interface from the shaft member 100. The torsion spring 200 is positioned about the shaft member 100 and has a first end 205 and a second end 210. The drive assembly 300 is positioned about the proximal end 105 of the shaft member 100 and is coupled to the first end 205 of the torsion spring 200. The drive assembly 300 is rotated by a motor (not shown) and the rotation of the drive assembly 300 compresses the torsion spring 200 via the coupling of the drive assembly 300 to the first end 205 of the torsion spring 200. The compression of the torsion spring 200 stores energy in the torsion spring 200 via the mechanical compression of the torsion spring 200 through this coupling of the drive assembly 300 to the first end 205 of the torsion spring 200. In other words, once the first end 205 of the torsion spring 200 engages securely with the drive assembly 300, the drive assembly 300 loads the torsion spring 200 with stored energy during rotation in a first direction 115 about the shaft member 100.

The drive assembly 300 includes a drive gear 305 that engages with a motor for rotating the drive assembly 300. The rotation of the drive assembly 300 via the motor loads the torsion spring 200 with energy. The drive gear 305 is fixedly secured to a first planar surface 312 of a drive hub 310 to engage the torsion spring 200 and positioned adjacent the proximal end 105 of the shaft member 100. A drive ratchet assembly 315 is disposed on a second planar surface 314 of the drive hub 310 which is opposite the first planar surface 312 and prevents the drive assembly 300 from prematurely releasing the stored energy in the torsion spring 200. A drive pawl 320 is hingedly secured to the second planar surface 314 of the drive hub 310 and engages the drive ratchet assembly 315. The engagement of the drive pawl 320 to the drive ratchet assembly 315 transfers/transmits the torque to the torsion spring 200 and prevents the premature release of the stored energy in the torsion spring 200.

The locking assembly 400 is coupled to the distal end 110 of the shaft member 100 and prevents and/or selectively initiates rotation in the second direction 120. The locking assembly includes a stop member 405 that further enables loading the torsion spring 200 for transferring torque to the lever member 500 by stopping the lever member 500 from rotating in the first direction 115. The locking assembly 400 includes a locking ratchet 410 and a locking pawl 415 that engages with the teeth of the locking ratchet 410 and prevents rotation of the lever member 500 in the second direction 120 while the drive assembly 300 loads energy into at least one torsion spring 200. As indicated most clearly in FIGS. 2 and 5, the locking pawl 415 hingedly connects to a trigger member 420 mounted to a shaft support member 425 that is positioned along the shaft member 100 between the locking ratchet 410 and the lever member 500.

In some examples, the trigger member 420 includes a pneumatic cylinder. In other examples, the trigger member 420 can be, for example, but not limited to a motor, a solenoid switch, and/or any other type of controllable actuator. The shaft support member 425 further supports the stop member 405 affixed thereto for preventing rotation of the lever member 500 in the first direction during loading of the at least one torsion spring 200.

The lever member 500 is affixed to the shaft member 100 and coupled to the second end 210 of the torsion spring 200 for the release of the stored energy from the torsion spring 200. The lever member 500 engages the stop member 405 to allow loading of the torsion spring 200 when the drive assembly 300 is rotated in the first direction 115.

When the lever member 500 rotates in the first direction 115 and stops against the stop member 405, the at least one torsion spring 300 stores energy as the drive gear 305 continues to rotate in the first direction 315. Actuating the trigger member 420 releases the locking pawl 415 from the locking ratchet 410 which enables the torsion spring 200 to apply torque to the lever member 500 in contact therewith. The shaft member 100 freely rotates in the second direction as the lever member 500 is energized by the release of energy from the previously loaded torsion spring 200. The shaft member 100 moves away from the first end of the torsion spring 200 during the release of energy that rotates the lever member 500 in the second direction because the shaft member 100 and drive assembly 300 are freely engaged and not coupled to one another. Combining the energy storage device, i.e. the torsion spring 200, into the drive assembly 300 advantageously enables the simple storage and release of energy without the need for integration of a clutch and/or a separate disengagement mechanism. In some examples, the torsion spring 200 can be a wire type or clock coil type torsion spring 200.

Once the lever member 500 has rotated in the second direction to the extent of applied torque and/or until stopped by another stop member or limit switch (not shown), the locking pawl 415 reengages with the locking ratchet 410, and the drive assembly rotates the lever member 500 and shaft member 100 in the first direction via the torsion spring 200 until the lever member 500 once again abuts the stop member 405. The process of loading the torsion spring 200 repeats until a triggering event actuates the trigger 420 and releases stored energy from the torsion spring 200.

In some examples, the torsion spring 200 is coupled to the drive assembly 300 via any mechanism (e.g., mechanical mechanism, electromagnetic mechanism, etc.) to provide adequate resistive forces during loading of the torsion spring 200. The coupling mechanism can be, for example, but not limited to, welding, bolting, riveting, friction fitting, screwing, slidably engaging within a retention slot, etc.

In other examples, a shoulder bolt 322 secures the drive pawl 320 to the drive hub 310. During loading of the torsion spring 200, a motor and gear train (not shown) can, for example, drive the drive pawl 320 into the teeth of the drive ratchet 315 while preventing rotation in a second direction 120 opposite the first direction 115. The drive assembly 300 further includes a pawl return 325. In other examples, the pawl return 325 includes a spring or rubber band that maintains the position of the drive pawl 320 within the teeth of the drive ratchet 315 during rotation of the drive assembly 300.

In some examples, the system 10 further includes at least one additional torsion spring 211 positioned about the shaft member 100 and coupled at a first end to the drive assembly 300 and at a second end to the lever member 500. The at least one additional torsion spring 211 can multiply torque applied to the lever member 500 (e.g., increase the torque by a factor of 1.5, increase the torque by a factor of 2, etc.). The at least one additional torsion spring 211 can be, for example, concentric with the at least one torsion spring 200 (e.g., as shown in FIG. 3). Although FIGS. 2, 3, 4A, and 4B depict the torsion spring 200 floating freely about the shaft member 100 without making any direct contact, in some examples, the torsion spring 200 is connected to the shaft member 100 (e.g., direct physical connection, indirect connection via another component, etc.).

Figure 6:
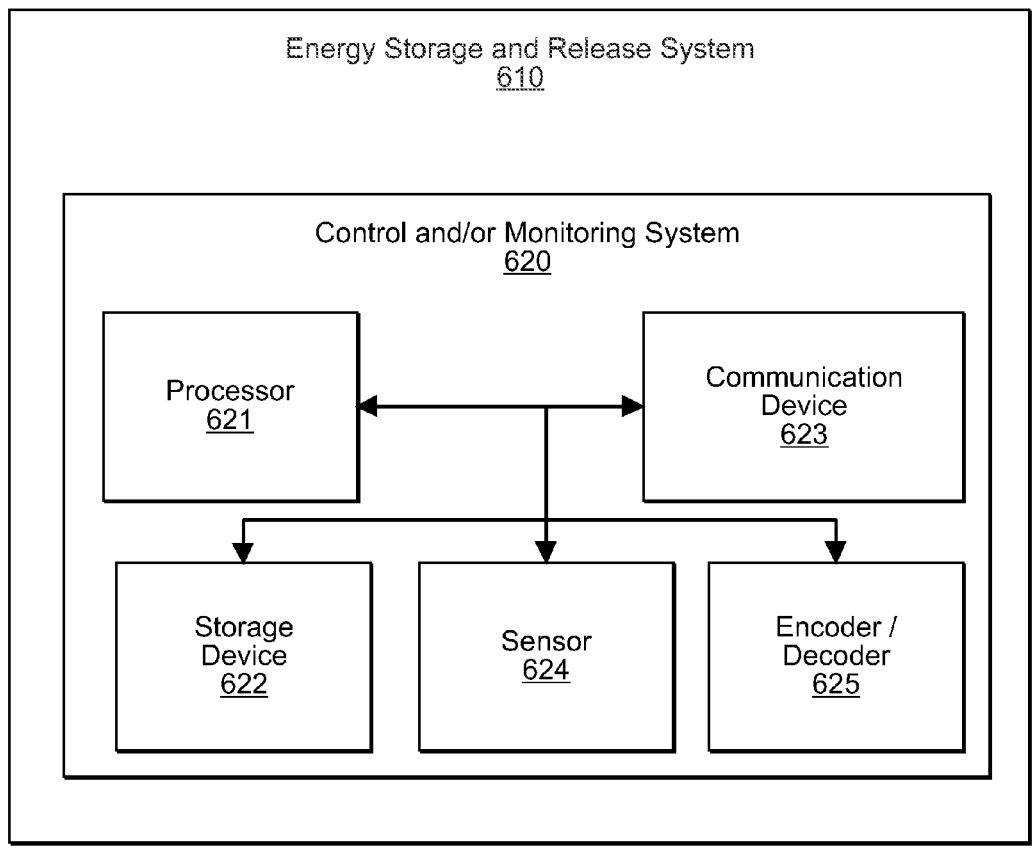
FIG. 6 depicts an exemplary energy storage and release system with a control and/or monitoring system.

FIG. 6 depicts an exemplary energy storage and release system 610 with a control and/or monitoring system 620. The control and/or monitoring system 620 includes a processor 621, a storage device 622, a communication device 623, a sensor 624, and an encoder/decoder 625. The processor 621 is programmed for controlling intelligent storage and/or release of stored energy either on demand and/or in response to a triggering event. The storage device 622 stores a set of instructions for the processor 621 for actuating the trigger member 420. The communication device 623 transmits and/or receives data from/to the control and/or monitoring system 620. The sensor 624 (e.g., proximity sensor, infrared sensor, optical sensor, strain gauge, pressure sensor, etc.) receives/senses information. The encoder/decoder 625 encodes and/or decodes information from the sensors 624 for use by the processor 621 (e.g., converts analog sensor data to digital data, decodes specialized sensor data for use by the processor 621, etc.). In some examples, the processor 621 is previously programmed and/or is dynamically programmed based on received data.

In some examples, referring to FIGS. 1, 2, 3, 4A, 4B and 5, triggering events include an object 1060 entering a predetermined proximity limit 1061 in spatial relation to the lever member 500 and/or the torsion spring 200 reaching a predetermined tension limit. In some examples the control and/or monitoring system 620 actuates the trigger member 420 in response to the trigger event. In other words, in this example, a feedback loop is utilized between the control and/or monitoring system 620 and the trigger member 420 to trigger the release of the stored energy in the system 10. For example, a pressure sensor (not shown) is mounted to the lever member 500 such that impact with an object triggers the release of stored energy and movement of the lever. As another example, an optical sensor (not shown) is mounted to the stop member 405 or shaft support member 425 and senses the approach of a moving or stationary object and triggers the release of the stored energy, thereby rotating the lever member 500. Table 1 illustrates exemplary feedback mechanisms for triggering the release of the stored energy.

TABLE 1

| | | Exemplary Triggers | |
|---|---|---|---|
| Sensor | Reading | Trigger | Action |
| Pressure | 1.4 lbs per square inch | 1.5 lbs per square inch | No Release—Stored Energy—15.0 Newtons |
| Optical | Positive Reading | Positive Reading | Release of Stored Energy—12.3 Newtons |
| Proximity | Four Readings within ten meters | One Reading within twenty meters | Release of Stored. Energy—2.3 lbs per square inch |

In other examples, the feedback loop is utilized between the control and/or monitoring system 620 and the drive assembly 300 to trigger the stopping of the storage of energy in the system 10. For example, a pressure sensor (not shown) is mounted to the lever member 500 such that impact with an object triggers the stopping of the storage of energy. As another example, an optical sensor (not shown) is mounted to the shaft support member 425 and senses the approach of a moving or stationary object and triggers the stopping of the storage of energy in the system 10. Table 2 illustrates exemplary feedback mechanisms for triggering the stopping of the storage of energy in the system 10.

TABLE 2

Exemplary Triggers

| Sensor | Reading | Trigger | Action |
|---|---|---|---|
| Pressure | 1.1 lbs per square inch | 1.0 lbs per square inch | Stop Storage of Energy - Stored Energy—11.0 Newtons |
| Optical | Negative Reading | Positive Reading | Continue Storage of Energy |
| Proximity | Two Readings within three meters | One Reading within ten meters | Continue Storage of Energy |

In other examples, the communication device 623 receives instructions for the processor via wired or wireless computer networks from a transmitting device in communication with the system 10 via a computer network (e.g., local area network, wide area network, Internet, etc.). The system 10 can be, for example, controlled via radio frequency (RF) or other wireless control mechanisms.

In some examples, the control and/or monitoring system 620 is a computer which includes standard computing elements. These standard computing elements include items such as a monitor, a keyboard, and a memory storage area. The memory storage area may be random access memory (RAM), or a combination of RAM and some removable memory storage means such as floppy disk, EPROMs, PROMs, or USB storage devices. The memory storage area contains computer readable code, or software, for executing the technology described herein. In other examples, the memory storage area can be a database server for an added level of security and more expansive storage capacity. In some examples, the control and/or monitoring system 620 communicates with an application server that stores and executes the software and/or with a web server that hosts an interactive website for transmitting instructions to the system 10 for the release of stored energy and/or the conditions for release of stored energy.

Bi-directional routers (not shown) also may be disposed between each of the transmitting device, the computer network, and between the computer network and the system 10. By way of example, the transmitting device may be a laptop computer, stationary computer, PCD, and cellular telephone.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

I claim:

1. An energy storage and release system, comprising:
a shaft member having a proximal end and a distal end;
at least one torsion spring positioned about the shaft member, the at least one torsion spring having a first end and a second end;
a drive assembly positioned about the proximal end of the shaft member and coupled to the first end of the at least one torsion spring, wherein the drive assembly loads the at least one torsion spring with stored energy during rotation of the drive assembly in a first rotational direction about the shaft member, the drive assembly including a drive pawl and gear assembly including at least one pawl and at least one gear configured to prevent rotation of the drive assembly in a second rotational direction during loading of the at least one torsion spring;
a locking assembly comprising a stop member, the locking assembly coupled to the distal end of the shaft member and including a ratchet pawl and gear assembly including at least one pawl and at least one gear configured to prevent rotation of the lever member in the second rotational direction during loading of the at least one torsion spring; and
a lever member affixed to the shaft member between the drive assembly and the locking assembly and coupled to the second end of the at least one torsion spring, the lever member engaging the stop member to allow loading of the at least one torsion spring when the drive assembly is rotated in the first rotational direction, wherein a release of the stored energy of the torsion spring rotates the lever member in the second rotational direction opposite the first rotational direction.

2. The system of claim 1, further comprising a trigger member engaged with the ratchet pawl and gear assembly configured to selectively release the stored energy and enable rotation of the lever member in the second rotational direction.

3. The system of claim 2, wherein the trigger member is a pneumatic cylinder coupled to the ratchet pawl.

4. The system of claim 2, further comprising a control and monitoring system configured to control and monitor the energy storage and release system, wherein the control/monitoring system actuates the trigger member in response to a trigger event.

5. The system of claim 4, wherein the trigger event is at least one of an object entering a predetermined proximity limit in spatial relation to the lever member and a predetermined tension limit of the torsion spring.

6. The system of claim 4, wherein the control and monitoring system includes at least one of a processor, an encoder and decoder, a pressure sensor, a proximity sensor, and an optical sensor.

7. The system of claim 1, further comprising a second torsion spring positioned about the shaft member and coupled at a first end to the drive assembly and at a second end to the lever member.

8. An energy storage and release device, comprising:
at least one torsion spring positioned about a shaft member, the at least one torsion spring having a first end and a second end;
a drive assembly positioned about the shaft member and coupled to the first end of the at least one torsion spring, wherein the drive assembly loads the at least one torsion spring with stored energy during rotation of the drive assembly in a first rotational direction about the shaft member, the drive assembly including a drive pawl and gear assembly including at least one pawl and at least one gear configured to prevent rotation of the drive assembly in a second rotational direction during loading of the at least one torsion spring;

a locking assembly comprising a stop member, the locking assembly coupled to the shaft member and including a ratchet pawl and gear assembly including at least one pawl and at least one gear configured to prevent rotation of the lever member in the second rotational direction during loading of the at least one torsion spring; and a lever member affixed to the shaft member between the drive assembly and the locking assembly and coupled to the second end of the at least one torsion spring, the lever member engaging the stop member to allow loading of the at least one torsion spring when the drive assembly is rotated in the first rotational direction, wherein a release of the stored energy of the torsion spring rotates the lever member in a second rotational direction opposite the first direction.

* * * * *